(12) United States Patent
Chang (10) Patent No.: US 6,328,239 B1
(45) Date of Patent: Dec. 11, 2001

(54) CLUTCH MECHANISM OF FISHING LINE WINDER

(76) Inventor: Liang-Jen Chang, No. 132, Fu-I Rd., I-Hsin Li, Tai-Ping City, Taichung Hsien (TW)

( * ) Notice: Subject to any disclaimer, the term of this patent is extended or adjusted under 35 U.S.C. 154(b) by 0 days.

(21) Appl. No.: 09/593,667

(22) Filed: Jun. 14, 2000

(51) Int. Cl.⁷ .................................................. A01K 89/02
(52) U.S. Cl. ............................................................. 242/245
(58) Field of Search .................................... 242/245, 247

(56) References Cited

U.S. PATENT DOCUMENTS

| | | | |
|---|---|---|---|
| 5,195,698 | * | 3/1993 | Kyoichi ................................ 242/245 |
| 5,201,477 | * | 4/1993 | Kawabe ................................ 242/245 |
| 5,511,735 | * | 4/1996 | Kaneko ................................ 242/245 |
| 5,738,292 | * | 4/1998 | Kang et al. ........................... 242/247 |
| 5,857,631 | * | 1/1999 | Sato ...................................... 242/245 |
| 5,865,386 | * | 2/1999 | Tao ....................................... 242/245 |
| 6,098,908 | * | 8/2000 | Ng ........................................ 242/245 |

* cited by examiner

Primary Examiner—Emmanuel M. Marcelo
(74) Attorney, Agent, or Firm—Browdy and Neimark (57) ABSTRACT

A fishing line winder comprises a main body, a rotor set pivoted to the main body; a spool set pivoted to the main body; a drag set linking and controlling the rotation of the spool set; a rotation control set actuating the rotor set to turn and having at least one retaining portion; a wrenching set pivoted to the main body and provided with a wrenching body and an elastic member for causing the wrenching set to move to a first position and a second position; a swiveling member pivoted to the wrenching set and provided with an actuated portion which is corresponding in location to the retaining portion of the rotary wheel at the time when the wrenching set is located at the first position; and a clutching rod fastened with the wrenching set for controlling a clutching plate to retain or release the drag set. When the wrenching set is moved to the first position, actuated portion of the swiveling member is urged by the retaining portion of the rotation control set. When the fishing line is wound, the rotary wheel is turned such that the retaining portion of the rotary wheel pushes the swiveling member to displace, thereby causing the wrenching set to turn to the second position so as to enable the clutching rod to release the clutching plate to retain the drag set.

13 Claims, 10 Drawing Sheets

CLUTCH MECHANISM OF FISHING LINE WINDER

FIELD OF THE INVENTION

The present invention relates generally to a fishing line winder, and more particularly to a clutch mechanism of the fishing line winder.

BACKGROUND OF THE INVENTION

Figure 1:
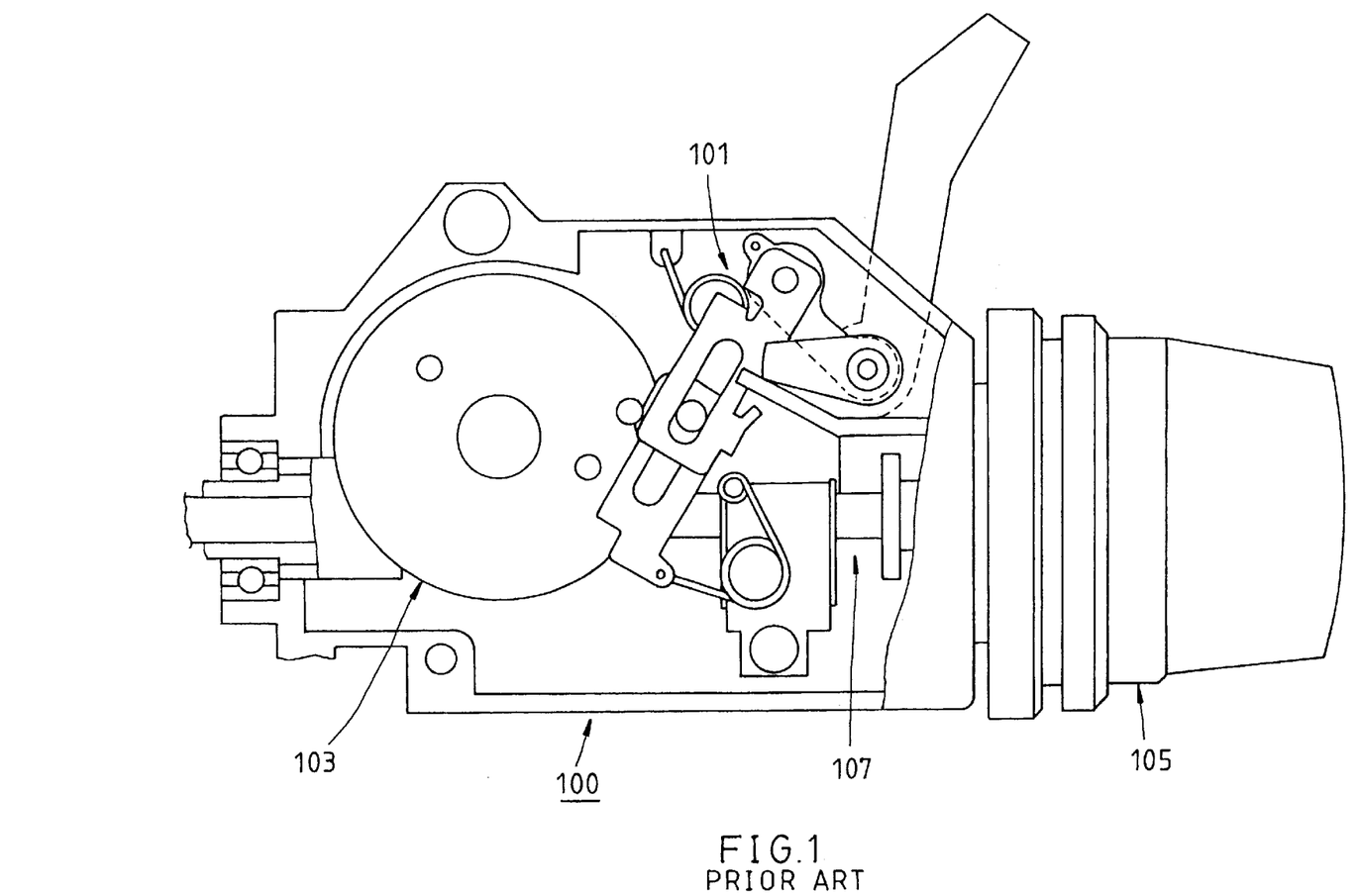
FIG. 1 shows a sectional view of a fishing line winder of the prior art.
Figure 2:
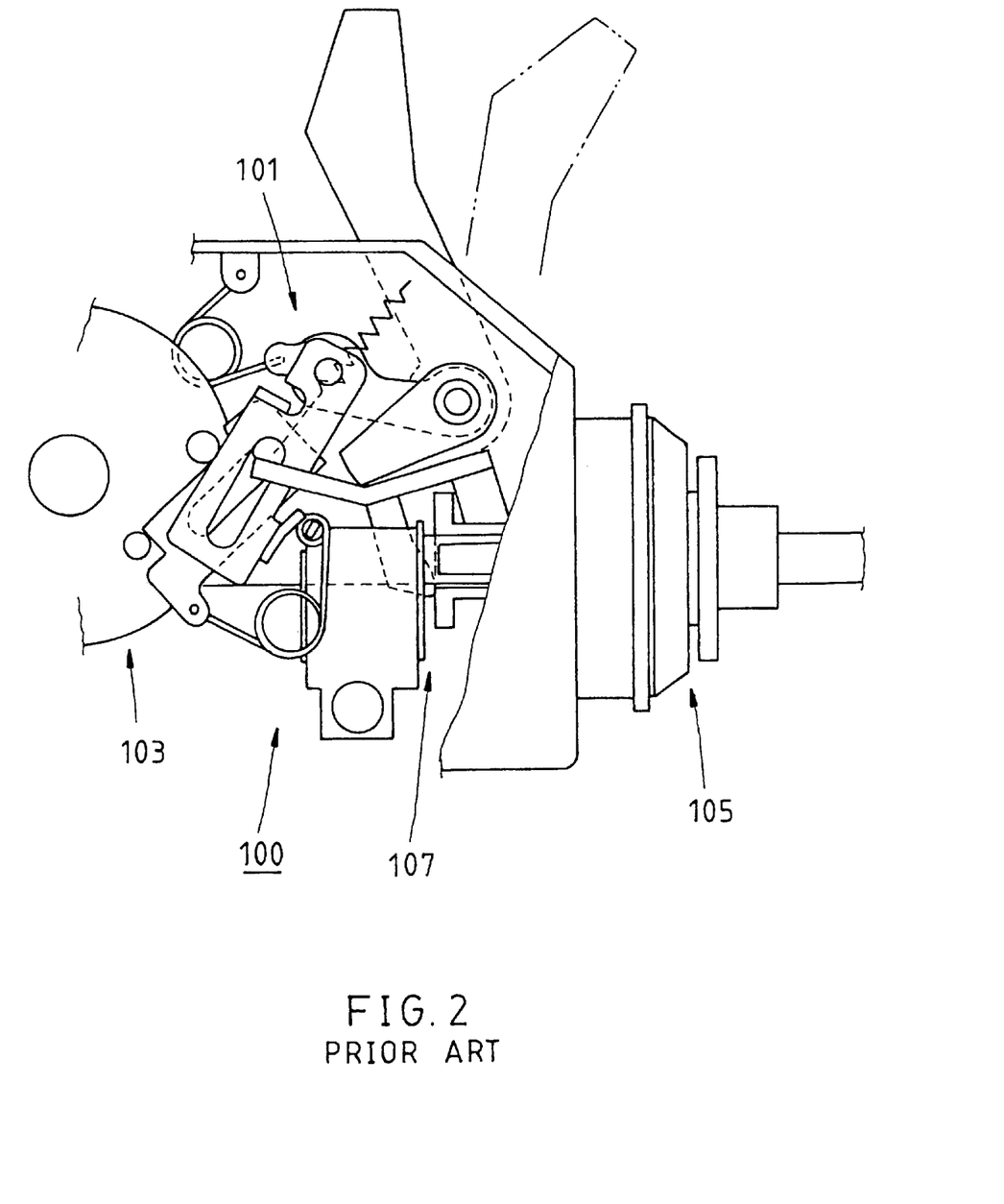
FIG. 2 shows a schematic view of clutch mechanism of the prior art fishing line winder in action.
Figure 3:
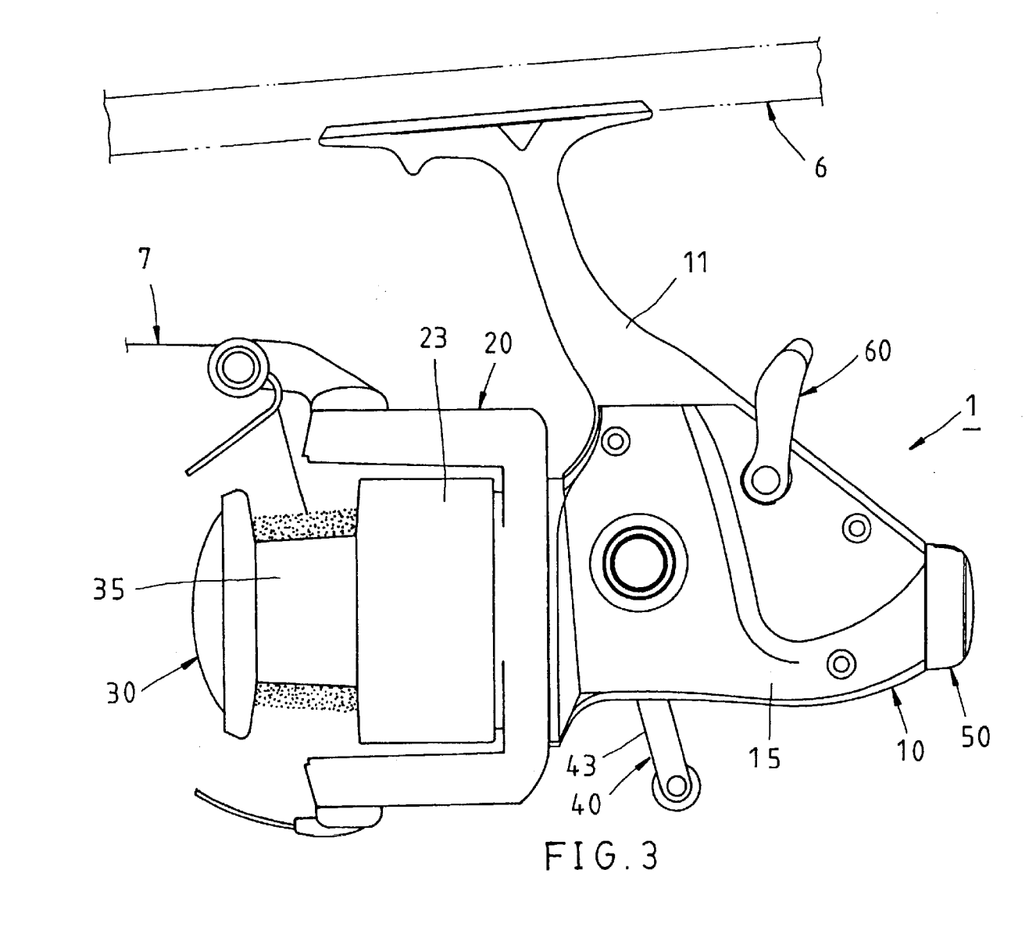
FIG. 3 shows a plan view of a preferred embodiment of the present invention.

As shown in FIG. 1, a fishing line winder 100 of the prior art comprises a clutch mechanism 101 which is disposed at a first position T1 such that clutch mechanism 101 is actuated to a second position T2 at the time when a wheel 103 is turned to wind the fishing line. A drag set 105 is thus arrested to confine the rotation of a spool 107, as shown in FIG. 2.

Such a prior art winder 100 as described above is defective in design in that it is complicated in construction and that it is made up of a number of component parts which are generally made by punching and pressing and are therefore apt to work without precision. As a result, the clutch mechanism of the prior art winder 100 is unreliable at best.

SUMMARY OF THE INVENTION

The primary objective of the present invention is to provide a fishing line winder with an improved clutch which is simple in construction.

It is another objective of the present invention to provide a fishing line winder with an improved clutch which operates with precision and speed.

It is still another objective of the present invention to provide a fishing line winder with an improved clutch which is compatible with a variety of the fishing line winders.

It is still another objective of the present invention to provide a fishing line winder with an improved clutch which is made up of relatively fewer component parts and is thus cost-effective.

In keeping with the principle of the present invention, the foregoing objectives of the present invention are attained by the clutch comprising a main body, a rotor set, a spool set, a rotation control set, a drag set, a wrenching set, a swiveling set, a clutching rod, and a clutching plate. The main body is fastened to a fishing rod. The rotor and the spool set are fastened pivotally with the main body. The spool set is linked with the drag set. The rotor set is actuated by the rotation control set to turn. The wrenching set is pivoted to the main body such that it can be moved between a first position and a second position, and that it is pivoted with the swiveling set. The clutching rod is connected with the wrenching set to control the clutching plate which in turn controls the rotation of the drag set. When the wrenching set is located at the first position, the swiveling set is urged by the rotary wheel. As the fishing line is wound, the rotor set is actuated to turn, thereby causing the swiveling set to displace. As a result, the wrenching set is moved to the second position. The clutching plate is thus released by the clutching rod to arrest the drag set so as to prevent the fishing line from being unwound.

BRIEF DESCRIPTION OF THE DRAWINGS

FIG. 11a shows a plan view of the wrenching set and the clutching rod made integrally with the wrenching set of the present invention.

FIG. 11b is a right side view of FIG. 11a.

DETAILED DESCRIPTION OF THE INVENTION

As shown in FIGS. 3–11, a fishing line winder 1 of the preferred embodiment of the present invention is mounted on a fishing rod 6 for winding a fishing line 7. The winder 1 comprises a plurality of component parts, which are described explicitly hereinafter.

A main body 10 is formed of a base 11 and an upper cover 15. The base 11 is of a hard-shelled construction and is provided with a mounting frame 111 for mounting the main body 10 on the fishing rod 6. The upper cover 15 is also of a hard-shelled construction and is joined with the base 11. The upper cover 15 has a position confining slot 153.

A rotor set 20 is composed of a toothed rod 21 which is pivoted with the main body 10, and of a rotor 23 fastened with the toothed rod 21.

A spool set 30 is formed of a main shaft 31 and a spool 35. The main shaft 31 is movably and axially disposed in the interior of the main body 10. The spool 35 is rotatably fastened with the main shaft 31 for winding therearound the fishing line 7.

A rotation control set 40 is pivoted to the main body 10 and is provided with a rotary wheel 41 which is rotatably connected with a handle 43 for actuating the toothed rod 21 of the rotor set 20. The rotary wheel 41 is provided on the rim with urging teeth 45 which are equidistantly arranged.

A drag set 50 is linked with the main shaft 31 of the spool set 30 and is provided with an adjustment knob 51, and a link sleeve 55 having a plurality of retaining grooves 551.

A wrenching set 60 has a shaft body 61 which is pivoted to the main body 10 and is provided with an inverted U-shaped wrenching body 63 for wrenching the shaft body 61. The wrenching set 60 further has a plate body 65 which is provided with an elastic member 67 (torsion spring) for causing the wrenching set 60 to swivel to a first position P1 and a second position P2.

A swiveling member 70 is pivoted with the plate body 65 of the wrenching set 60 and is provided with an actuated portion 71, a position confining portion 73, and a tension spring 75. The actuated portion 71 is engaged with the urging teeth 45 of the rotation control set 40 at such time when the wrenching set 60 is located at the first position P1. The position confining portion 73 is movably disposed in the position confining slot 153 of the main body 10.

A clutching rod 80 has a fastening portion 81 and an urging end 83. The fastening portion 81 is fastened with the shaft body 61 of the wrenching set 60.

A clutching plate 90 has a driven end 91, a compression spring 93, and a retaining rod 95. The driven end 91 is actuated by the clutching rod 80.

Figure 4:
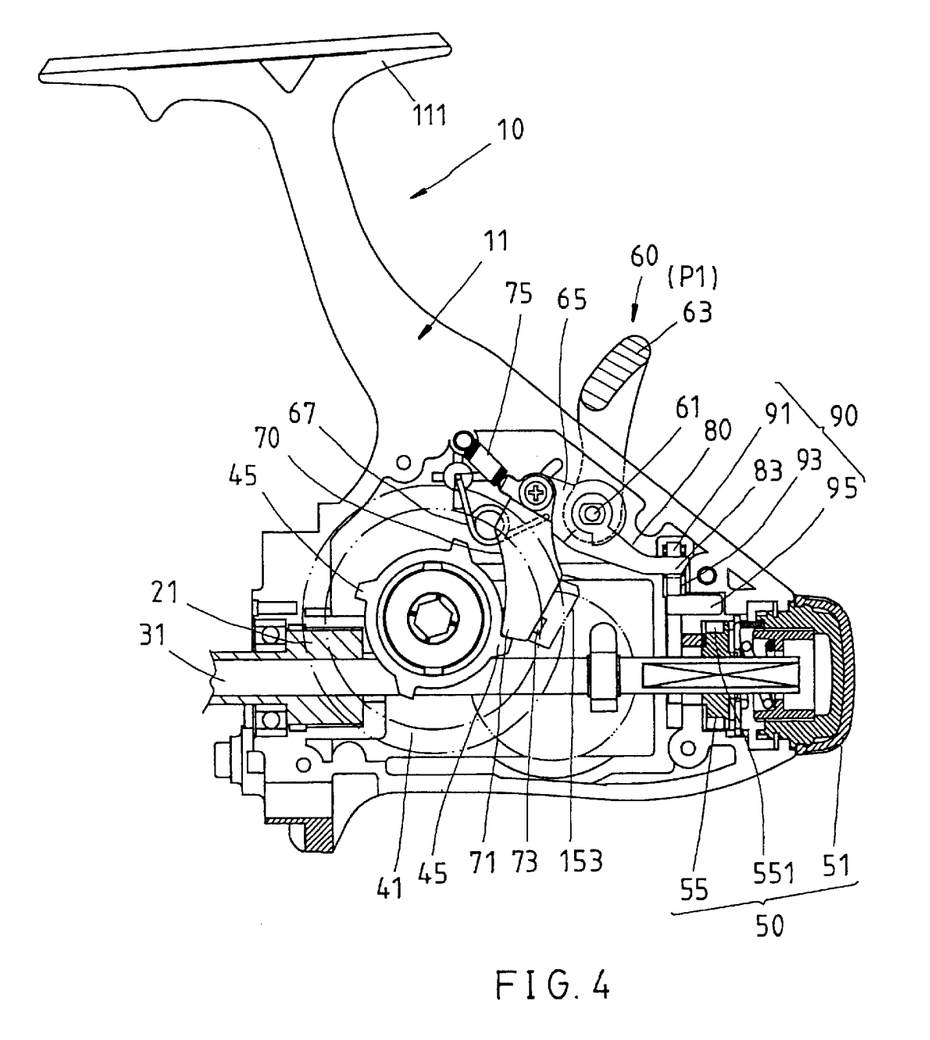
FIG. 4 shows a schematic view of the preferred embodiment of the present invention in combination.
Figure 5:
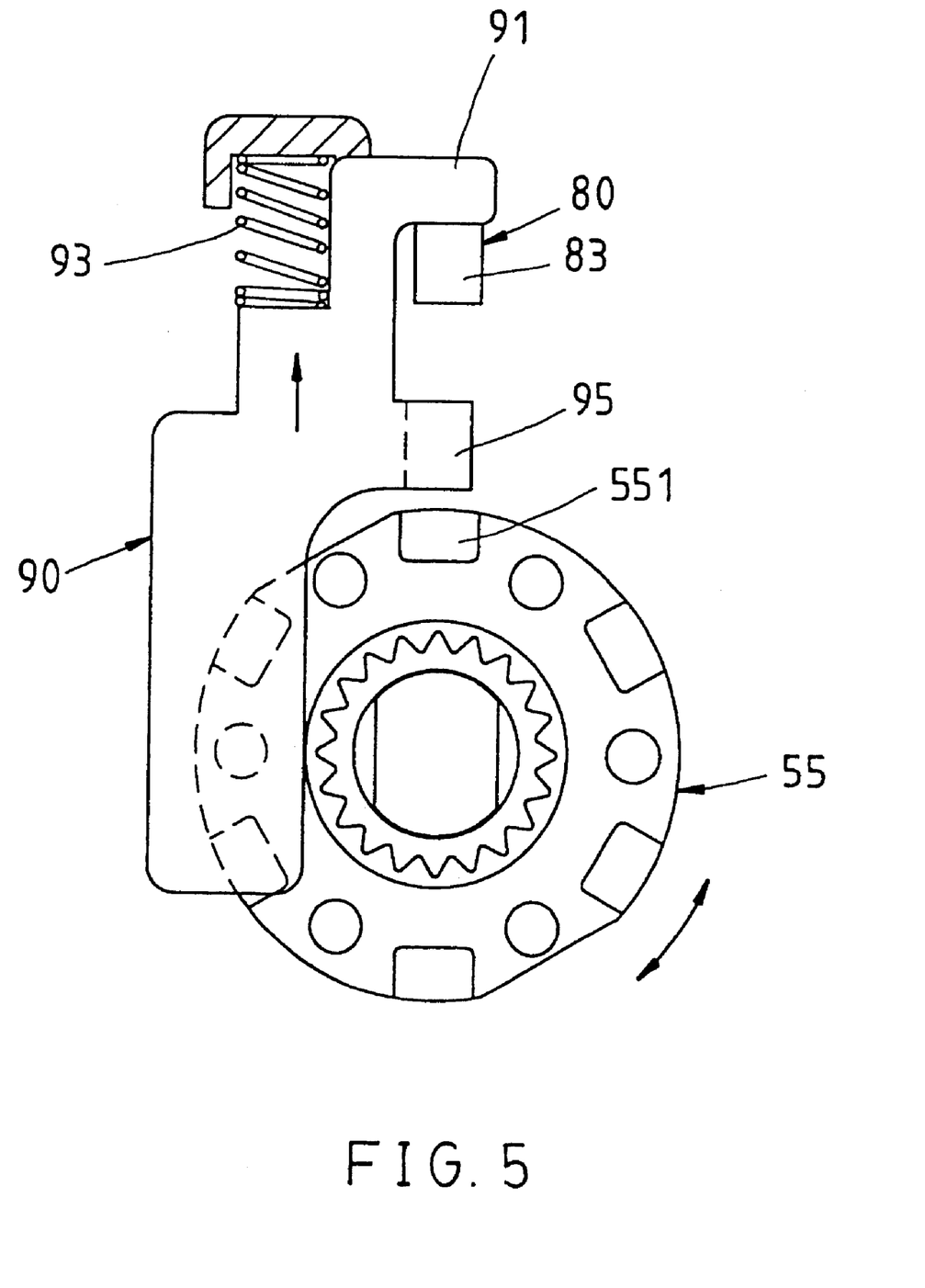
FIG. 5 shows a partial schematic view of the preferred embodiment of the present invention in action.
Figure 6:
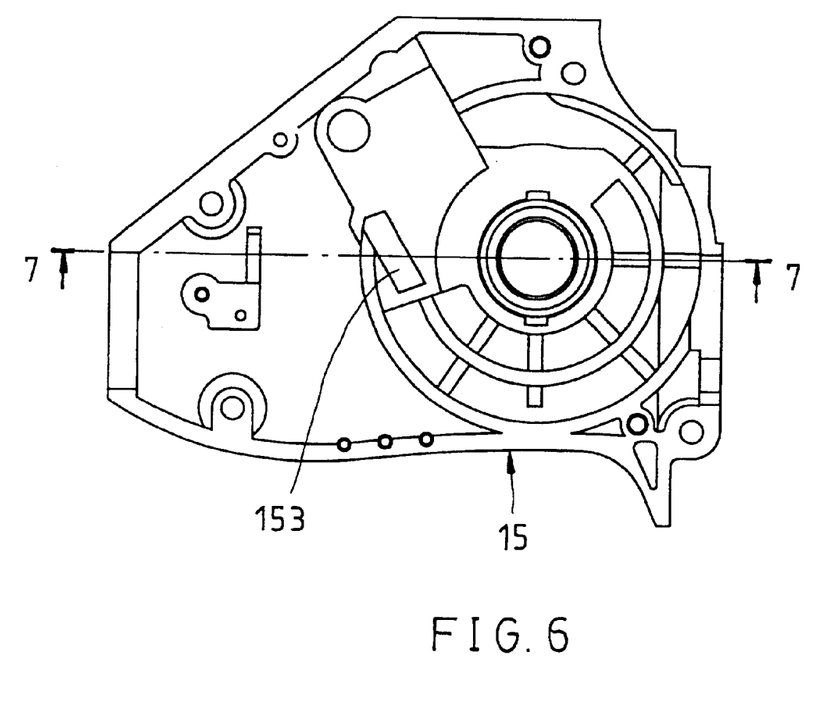
FIG. 6 shows a schematic end view of an upper cover of the preferred embodiment of the present invention.
Figure 7:
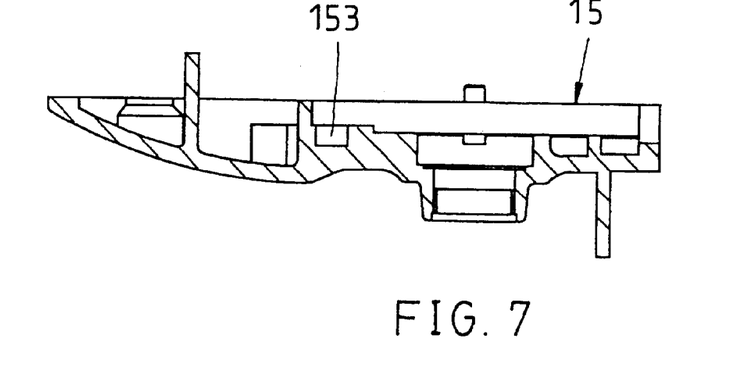
FIG. 7 shows a sectional view taken in the direction indicated by a line 7—7 as shown in FIG. 5.
Figure 8:
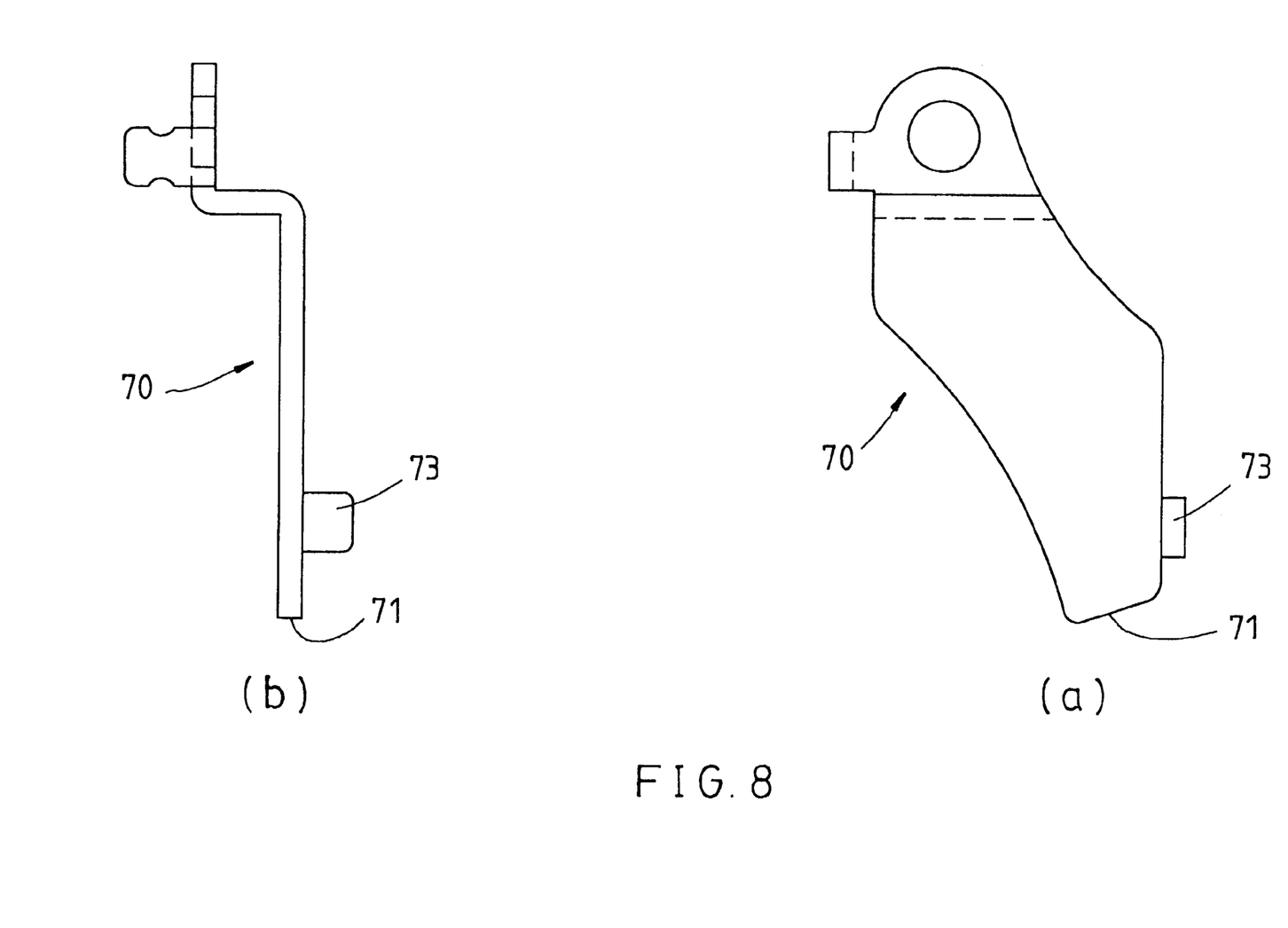
FIG. 8a shows a front view of the swiveling member of the preferred embodiment of the present invention.
FIG. 8b shows a left side view of the swiveling member of the preferred embodiment of the present invention.

As shown in FIGS. 4 and 5, when the wrenching set 60 is located at the first position P1, the actuated portion 71 of the swiveling member 70 is engaged with the urging teeth 45 of the rotary wheel 41. In the meantime, the clutching plate 90 is urged upward by the urging end 83 of the clutching rod 80 so as to prevent from being retained in the retaining groove 551 of the link sleeve 55 of the drag set 50. As a result, the main shaft 31 of the spool set 30 is capable of turning freely.

Figure 9:
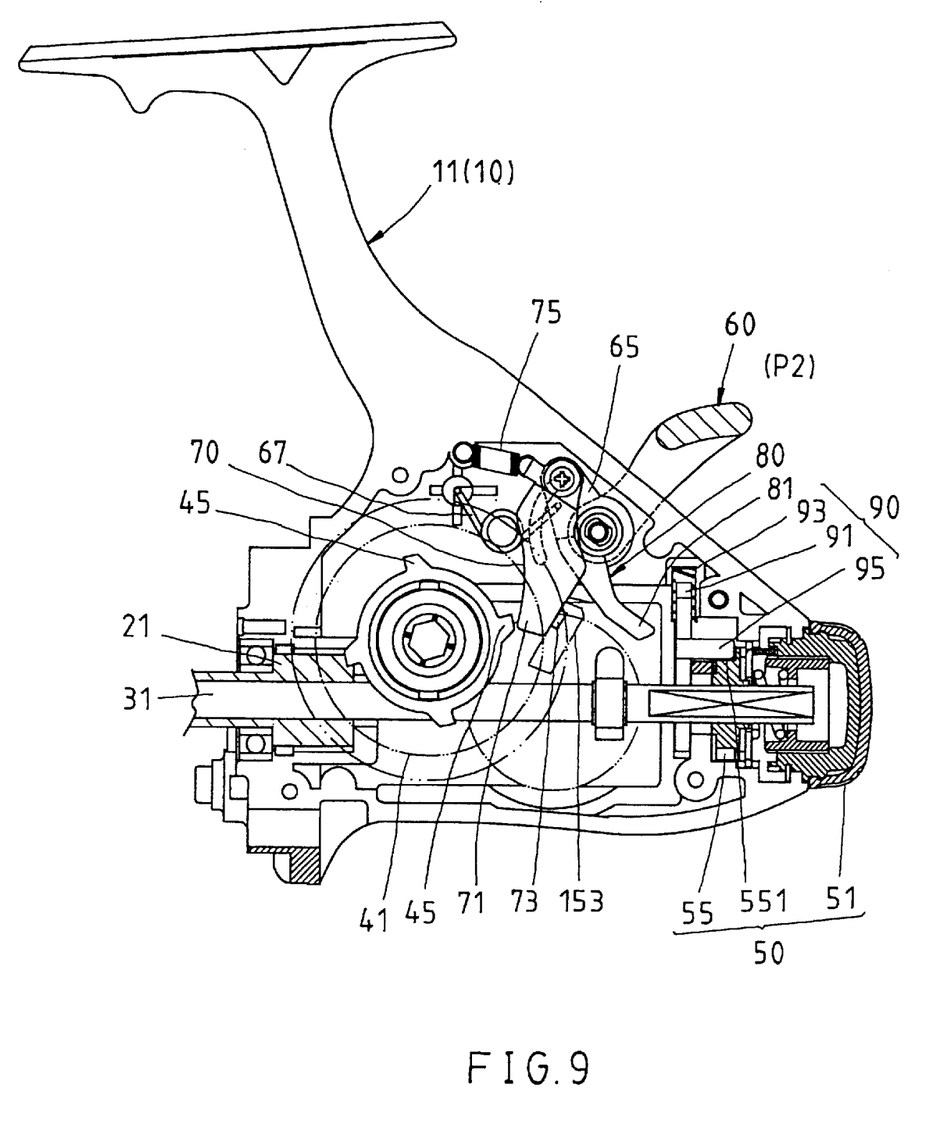
FIG. 9 shows another schematic view of the preferred embodiment of the present invention in action.
Figure 10:
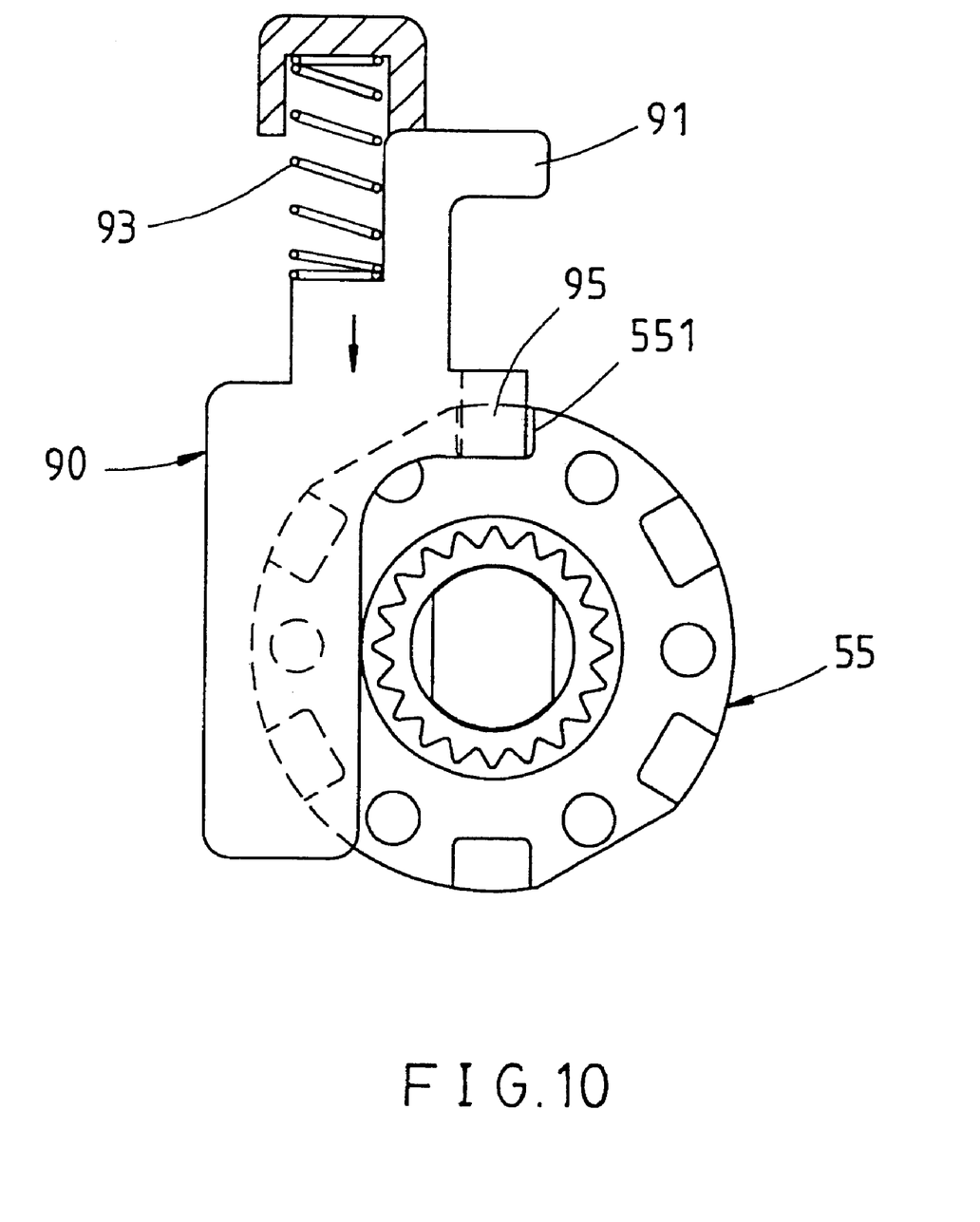
FIG. 10 shows an end view of the clutching plate and the drag set of the preferred embodiment of the present invention in action.
Figure 11:
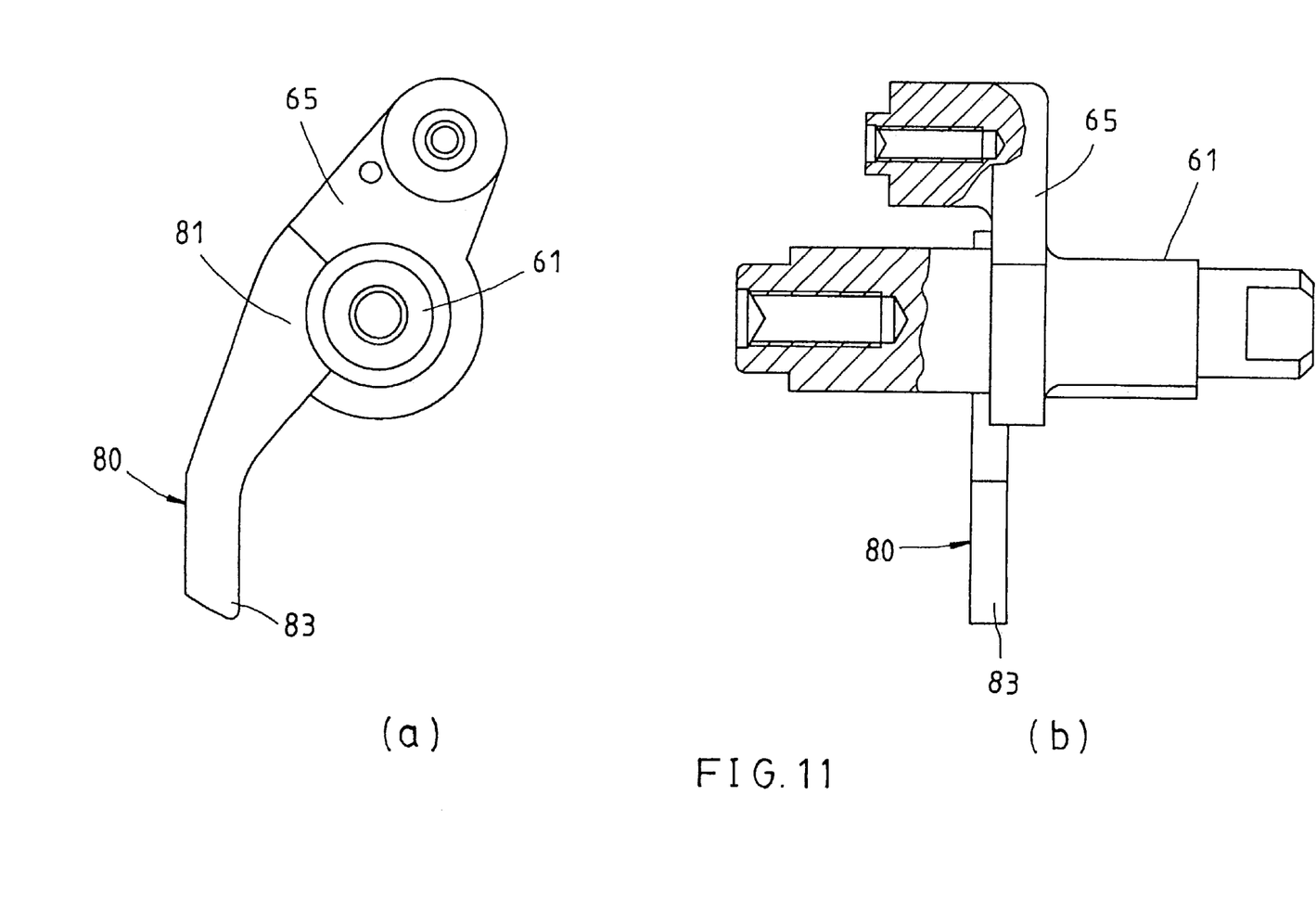

As the fishing line 7 is wound such that the rotation control set 40 is turned, the rotary wheel 41 is turned such that the urging teeth 45 push the swiveling member 70 to displace, thereby causing the wrenching set 60 to swivel to the second position P2. As a result, the clutching rod 80 releases the clutching plate 90, which is then retained in the retaining groove 551 of the link sleeve 55, as shown in FIGS. 9 and 10. The rotation of the main shaft 31 is thus so confined as to prevent the fishing line 7 from being unwound.

The embodiment of the present invention described above is to be regarded in all respects as being merely illustrative and not restrictive. Accordingly, the present invention may be embodied in other specific forms without deviating from the spirit thereof. The present invention is therefore to be limited only by the scopes of the following appended claims.

What is claimed is:

1. A fishing line winder comprising:
   a main body mounted on a fishing rod;
   a rotor set pivoted to said main body;
   a spool set comprising a spool and a main shaft connected with said spool and disposed movably in said main body;
   a drag set linked with said main shaft of said spool set;
   a rotation control set formed of a rotary wheel for actuating said rotor to turn, said rotary wheel being provided with one or more retaining portions;
   a wrenching set pivoted to said main body and formed of a shaft body, a wrenching body, and an elastic member for pushing said wrenching set to swing to a first position and a second position;
   a swiveling member pivoted to one end of said wrenching set and provided with an actuated portion whereby said actuated portion is corresponding in location to said retaining portions of said rotation control set at the time when said wrenching set is located at said first position;
   a clutching rod fastened with said wrenching set; and
   a clutching plate actuated by said clutching rod to control the rotation of said drag set;
   said actuated portion of said swiveling member being retained by said retaining portion of said rotary wheel at such time when said wrenching set is moved to said first position, said wrenching set being moved to said second position at such time when said rotary wheel is so turned such that said retaining portion of said rotary wheel pushes said wrenching member to displace, thereby causing said clutching rod to release said clutching plate to retain said drag set to prevent said main shaft from turning.

2. The winder as defined in claim 1, wherein said retaining portions of said rotary wheel are urging teeth.

3. The winder as defined in claim 1, wherein said retaining portions of said rotary wheel are disposed in four equal parts on the rim of said rotary wheel.

4. The winder as defined in claim 1, wherein said main body is formed of a base and an upper cover.

5. The winder as defined in claim 1, wherein said swiveling member is provided with an elastic member to enable said actuated portion to remain corresponding in location to said retaining portions of said rotary wheel.

6. The winder as defined in claim 1, wherein said elastic member of said wrenching set is a torsion spring.

7. The winder as defined in claim 1, wherein said swiveling member further has a first position confining portion; wherein said main body is provided with a second position confining portion.

8. The winder as defined in claim 7, wherein said first position confining portion of said swiveling member is a protruded portion; wherein said second position confining portion of said main body is a position confining slot.

9. The winder as defined in claim 1, wherein said clutching rod and said shaft body of said wrenching set are made integrally.

10. The winder as defined in claim 1, wherein said retaining portion of said rotation control set is made integrally with said rotary wheel.

11. The winder as defined in claim 1, wherein said wrenching body of said wrenching set is of an inverted U-shaped construction.

12. The winder as defined in claim 1, wherein said clutching plate is provided with a retaining rod for retaining said drag set.

13. The winder as defined in claim 1, wherein said clutching plate is urged by an elastic member; wherein said clutching rod has an urging end for urging said clutching plate.

* * * * *